(12) United States Patent
Lepeltier

(10) Patent No.: US 6,337,458 B1
(45) Date of Patent: Jan. 8, 2002

(54) METHOD FOR AUTOMATICALLY SELECTING THE WELDING SEQUENCE FOR MANUAL WELDING ELECTRODE HOLDERS; MANUAL WELDING ELECTRODE HOLDER FOR IMPLEMENTING THE METHOD

(75) Inventor: Hervé Lepeltier, Angers (FR)

(73) Assignee: ARO (FR)

( * ) Notice: Subject to any disclaimer, the term of this patent is extended or adjusted under 35 U.S.C. 154(b) by 0 days.

(21) Appl. No.: 09/643,923

(22) Filed: Aug. 23, 2000

(30) Foreign Application Priority Data

Aug. 26, 1999 (FR) .............................................. 99 10813

(51) Int. Cl.⁷ ........................... B23K 11/00; B23K 9/10; B23K 11/24
(52) U.S. Cl. ...................... 219/117.1; 219/110; 219/108
(58) Field of Search ............................... 219/117.1, 108, 219/110, 78.01, 86.21, 86.25, 136, 138

(56) References Cited

U.S. PATENT DOCUMENTS

| | | | | |
|---|---|---|---|---|
| 3,529,118 A | * | 9/1970 | Eisele | 219/90 |
| 4,590,577 A | * | 5/1986 | Nio et al. | 364/513 |
| 4,937,759 A | * | 6/1990 | Vold | 364/513 |
| 5,025,126 A | * | 6/1991 | Hansen | 219/125.1 |
| 5,493,093 A | * | 2/1996 | Cecil | 219/110 |
| 5,945,011 A | * | 8/1999 | Takano et al. | 219/108 |

FOREIGN PATENT DOCUMENTS

| | | | | |
|---|---|---|---|---|
| JP | 03243285 | | 10/1991 | |
| JP | 08206846 | | 8/1993 | |
| JP | 08-206846 | * | 8/1996 | .............. 219/117.1 |
| JP | 10216955 | | 8/1998 | |
| SU | 1785153 | * | 8/1996 | ...... 219/138 ...... |

* cited by examiner

*Primary Examiner*—Tom Dunn
*Assistant Examiner*—L. Edmondson
(74) *Attorney, Agent, or Firm*—Piper Marbury Rudnick & Wolfe

(57) ABSTRACT

The electrode holder comprises a body 1 suspended by an articulated link 9, 13, 14 from a sling 6, this articulated link comprising a pivot collar 13 in which the body can rotate around a principal longitudinal, swiveling axis X and a pivot 14 mounted on this collar and by means of which the body 1 can pivot on the end of the sling 6 around a horizontal lateral axis y perpendicular to axis X. The body 1 is integral with an inclinometer giving the value and sense of the angle of pivot of the body around the principal axis X, and of the lateral axis y in relation to a reference vertical. This information is used to identify the welding location and to automatically select the appropriate welding sequence corresponding to this location. This sequence is coded and transferred to a welding control cabinet to be executed.

13 Claims, 3 Drawing Sheets

METHOD FOR AUTOMATICALLY SELECTING THE WELDING SEQUENCE FOR MANUAL WELDING ELECTRODE HOLDERS; MANUAL WELDING ELECTRODE HOLDER FOR IMPLEMENTING THE METHOD

FIELD OF THE INVENTION

The present invention concerns, firstly, a method for automatically selecting a welding sequence for manual welding electrode holders, relating in particular to an electric resistance spot welding electrode holder for assembling sheet metal.

DESCRIPTION OF THE PRIOR ART

In principle, such a manual electrode holder comprises an electrode holder body connected by a flexible cable to an electric current supply and including, if appropriate, a step-down transformer suitable for supplying the electrode holder with high-intensity current, said electrode holder body being suspended by means of an articulated link from a sling extending in the vertical plane when at rest and preferably provided with a balancing reel. This articulated link usually comprises, firstly, a circular pivot collar inside which said electrode holder body can rotate around a principal longitudinal, swiveling axis and, secondly, a pivot mounted on said circular collar, by means of which said collar and therefore the electrode holder body can pivot on the lower end of said sling around a horizontal lateral axis perpendicular to said longitudinal axis. Finally, such an electrode holder includes at least one handle by means of which an operator can suitably manipulate the electrode holder in relation to the sheet metal to be welded, following which he can initiate said welding sequence by actuating a control trigger or similar device on the electrode holder.

As is known, the main parameters for a welding sequence are the intensity of the welding current, the force applied to the sheet metal between the electrodes and the welding time, which parameters must be precisely determined for each welding point. Currently it is the operator who, after positioning the electrode holder in relation to the sheet metal to be welded, selects the specific sequence which is appropriate, then initiates the welding cycle. A risk therefore exists that, through error or a lapse of memory or attention, the operator selects a sequence which is not appropriate to the welding point, giving rise to a defective spot weld. This risk is variable, as it may depend on fatigue of the operator and on environmental conditions, but it is very difficult to eliminate completely. To reduce it, the number of different sequences which can be selected by the operator on each electrode holder is in some cases limited to two or three.

To avoid creating a constraint detrimental to the output and flexibility of use of electrode holders by being obliged to put into operation a relatively large number of manual electrode holders in a welding zone for which a large number of different welding sequences is required, selection of the specific sequence can be enabled by the manual selection of a welding sequence using a coder wheel or contacts located on the electrode holder or on the welding control cabinet, or by closing external contacts by means of a system which can be automated and can make use of displacement of a contact arm by means of the electrode holder to close the contacts corresponding to the welding sequence, or a programmable automatic device to specify the number of the sequence in terms of the occurrence of the welding point, or a zone delimiter when different welding points are welded in different zones of the workshop, all of which solutions are troublesome or restrictive for the operator.

SUMMARY OF THE INVENTION

The objective of the present invention is to eliminate all these disadvantages of the prior art and to automate the selection of the welding sequence according to the orientation of the electrode holder in relation to a reference direction which in this case will be the vertical. In this way the same electrode holder can be used for a larger number of different welding points without risk of error regarding the correct welding sequence for each point.

To this end an automatic selection method of the type defined at the outset is principally characterized, according to the present invention, in that said electrode holder body is integral with an inclinometer unit which is able to generate at least two sets of information in the form of signals:

a) information representing the value and direction of the angle of pivot of said electrode holder body around said principal longitudinal axis in relation to a reference axis; and b) information representing the value and direction of the angle of pivot of said electrode holder body around said lateral axis in relation to said reference axis, following which this information is used to identify the welding location and to carry out the automatic selection of the appropriate welding sequence corresponding to this location, the welding sequence identified being so coded as to be able to be transferred to and then executed by a welding control cabinet.

The invention therefore consists essentially in automatically selecting the specific desired welding sequence at a determined location on the sheet metal to be welded, according to the orientation of the electrode holder, i.e. according to the inclination of the electrode holder body in relation to the reference vertical when the electrodes are correctly positioned on the sheet metal at this location. In addition, since the position of the electrodes in relation to the sheet metal directly influences the quality of the weld at the welding point, it may be provided that execution of the cycle is only authorized if the electrodes are actually positioned correctly in relation to the sheet metal at this location, i.e. if the electrode holder is situated globally in a plane parallel to that of the sheet metal to be welded, the electrodes then contacting the surface of the sheet metal perpendicularly; the tolerance on the positioning of the electrode holder may, however, be adjustable.

A method according to the invention can also be characterized by a prior phase of programming or reprogramming of the different welding points in a "learning" mode, carried out by means of an interface separate from said electrode holder, which interface is provided as a mobile autonomous unit and can be connected to said control cabinet during this programming or reprogramming, said phase consisting, for each welding point, in positioning the welding electrode holder in the desired position at the welding point concerned and recording in a memory the characteristic angles of pivot of the body of the electrode holder around said longitudinal and lateral axes as well as the acceptable tolerances for these angles, and in identifying the number of the welding sequence desired at the point concerned, a reprogramming being preceded by an operation to erase the parameters previously recorded from said memory.

Of course, before validating the program or the new program, it is verified that there is no competition between the position registered and a position already programmed; if this is the case the programmer has the choice between abandoning the new program or overwriting the previous competing program. In any case, during an erasing cycle the programmer has the choice between deleting all the programs residing in the memory or deleting them one by one. In this latter case, the programmer selects the program to be deleted by placing the electrode holder in the position corresponding to this program.

To increase the reliability of the method, means can be provided for programming a determinate order of welding sequences in a welding sequencer and for verifying its agreement with the sequence detected by means of said inclinometer unit.

With a similar end in view means can also be provided for carrying out a verification of the position of the electrodes in relation to the sheet metal to be welded and to the location of the weld, in order to check that the operator is properly aligning the electrode holder at this location. To do this, a video camera, for example, or any other system for three-dimensional positioning, may be used.

Advantageously, a method according to the invention may also be characterized in that said inclinometer unit includes at least two accelerometers able to measure angular displacement of said longitudinal and lateral axes of the electrode holder body in relation to a vertical reference axis.

These accelerometers, being subjected to the acceleration of gravity, will allow the inclination of the reference axes of the electrode holder body in relation to a vertical reference axis to be known.

Advantageously also, said inclinometer unit includes a third accelerometer able to measure the angular displacement of a third axis of the welding electrode holder body perpendicular to said lateral and longitudinal axes, in relation to said vertical reference axis.

The measurement given by this inclinometer will in principle enable differentiation between two positions which are symmetrical with respect to the vertical from the standpoint of the sensors but which correspond to two quite different positions of the electrode holder.

In practical terms, it can also be provided that each of the vertical planes containing the longitudinal and lateral axes of the electrode holder body is divided, on either side of the horizontal plane, into a certain number of identifiable sectors, the orientation of the electrode holder then being registered by identifying the two sectors in which the axes of the two corresponding accelerometers are located respectively.

These sectors (each of which being, for example, 5° of arc) can, of course, be identified within a certain tolerance. Similarly, during programming the sector of each axis to which the welding point belongs for correct positioning of the electrode holder will be determined. The tolerance could be, for example, ±10° in relation to the programmed position, in the case of each axis.

Optionally, it can also be provided that said electrode holder body additionally carries a detector of rotation around said vertical reference axis, for example, an optical encoder, to measure the rotation of the electrode holder around this axis.

This arrangement will make up for the fact that the accelerometers are insensitive to rotation of the electrode holder in a horizontal plane around the vertical reference axis. It could therefore be put into operation when it is also desired to know the angles of this rotation of the electrode holder around the vertical.

The present invention also concerns a manual electrical spot welding electrode holder of the type mentioned at the outset for implementing the method defined above, this electrode holder being principally characterized in that said electrode holder body carries an inclinometer unit which is able to supply at least two sets of information in the form of signals:

a) information representing the value and direction of the angle of pivot of said electrode holder body around said principal longitudinal axis in relation to a reference axis; and b) information representing the value and direction of the angle of pivot of said electrode holder body around said lateral axis in relation to said reference axis, following which this information is used to identify the welding location and to carry out the automatic selection of the appropriate welding sequence corresponding to this location, the welding sequence identified being so coded as to be able to be transferred to and then executed by a welding control cabinet.

It is advantageous, particularly from the point of view of cost, space requirement, robustness and reduced response time, for this inclinometer unit to make use of accelerometers of the capacitance type, sensitive to the acceleration of gravity and supplying an inclination signal of the type with width-modulated pulses.

BRIEF DESCRIPTION OF THE DRAWINGS

The following drawings, given by way of non-limiting examples, will allow better understanding of the present invention. In these drawings.

DETAILED DESCRIPTION OF THE INVENTION

Figure 1:
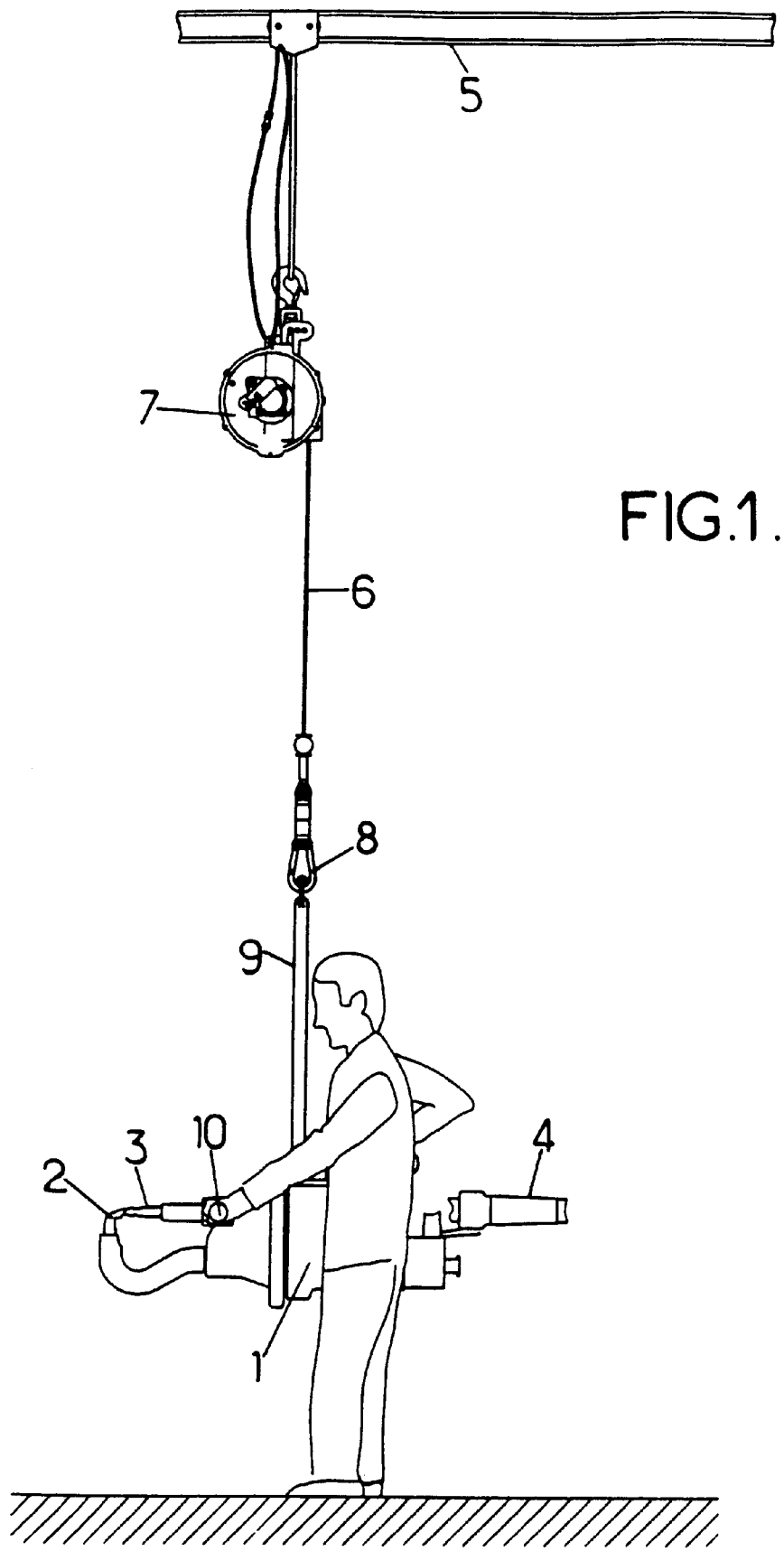
FIG. 1 represents a manual electrode holder for electrical spot welding suspended from a sling and manipulated by an operator.
Figure 2:
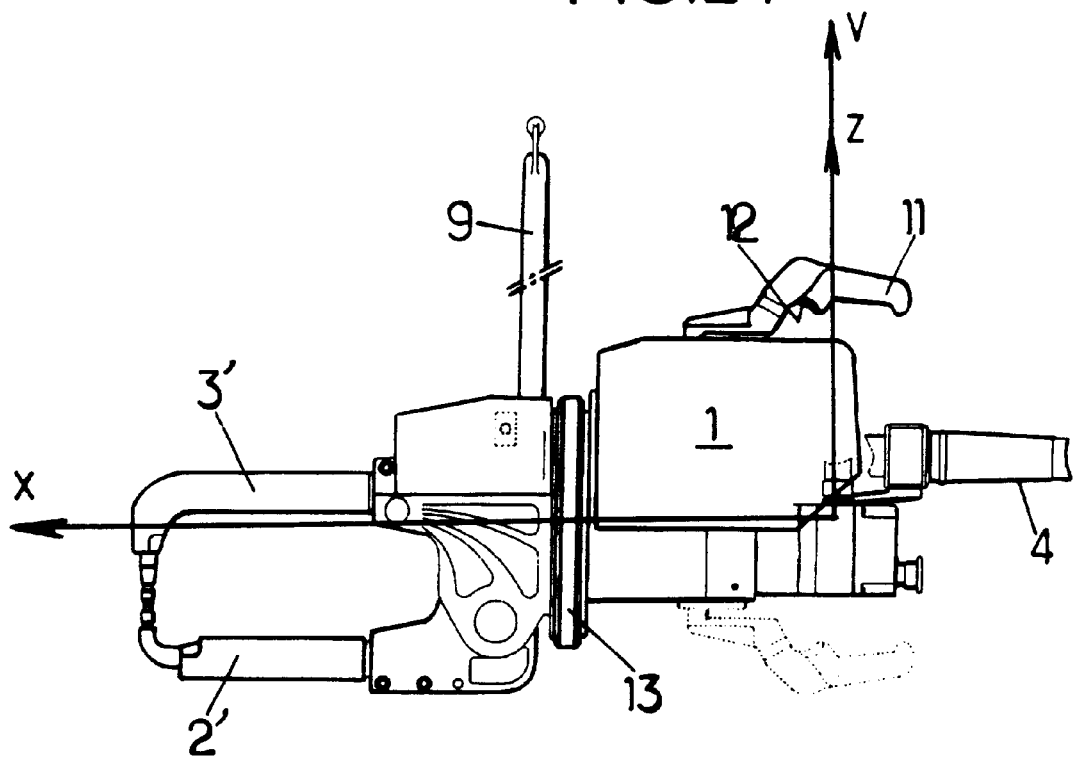
FIG. 2 is a more detailed side view of this electrode holder.

In FIG. 1 a manual electrical spot welding electrode holder body 1 intended in particular for welding sheet metal (not shown) by means of welding electrodes 2 and 3 is shown schematically. This electrode holder body can carry its own transformer, connected to an electrical supply source by a flexible cable 4, which cable may if necessary contain or be associated with a water circuit for cooling the electrodes. The assembly is suspended from a rail 5 by means of a sling 6 provided with a reel 7 including a device for balancing the weight of the electrode holder, for example of the type using a spring. The link between the hook 8 of the sling 6 and the body 1 of the electrode holder is effected by means of a rigid bar 9. The operator has the use of two handles 10 and 11 for manipulating the electrode holder. The second handle 11 can be see in the more detailed side view in FIG. 2, in which electrodes 2' and 3', slightly different from those in FIG. 1, are shown; the handle 11 advantageously has a trigger or similar device 12, by means of which the operator can initiate the welding sequence when he has positioned the electrodes in relation to the sheet metal to be welded.

Figure 3:
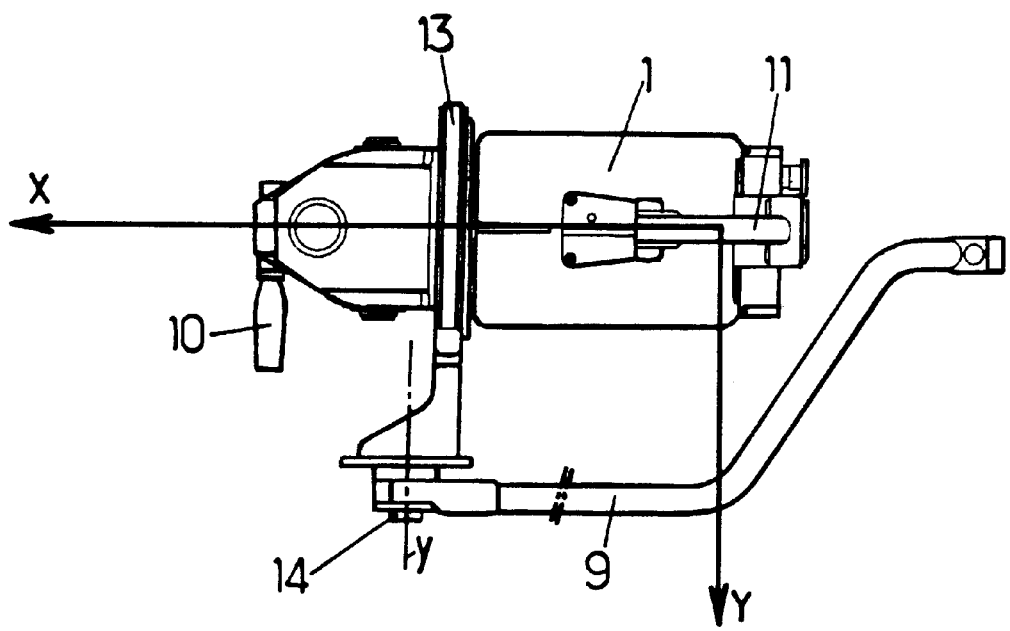
FIG. 3 is a top view, without the electrodes.

To carry out this positioning the operator can, of course, pivot the electrode holder body 1 around the vertical axis V constituted by the sling 6. He can also pivot it around a swiveling longitudinal axis X, the body 1 being pivotally mounted, for this purpose, in a circular collar 13 connected to the lower end of the rigid bar 9 (in FIG. 3 this bar is shown folded down into the horizontal plane). The operator can also pivot the electrode holder body 1 around the lateral horizontal axis y of a pivot 14 pivotally connecting the lower end of the rigid bar 9 to the circular collar 13.

In this way a reference positioning system can be associated with the electrode holder body, said system having three axes: the pivot axis X or the longitudinal axis of the electrode holder, a vertical axis Z parallel to the sling 6, and a lateral axis Y parallel to the axis of rotation y and perpendicular to the axes X and Z. Given that the inclinometer unit (not shown in FIGS. 1 to 3) measures the pivoting of the electrode holder by means of accelerometers sensitive to gravity acceleration, the only possible reference axis is the vertical V. Consequently, the inclinometer will measure the pivoting of the electrode holder body on axis X by measuring the pivoting of axis Y in relation to the vertical V, by means of an accelerometer subjected to forces exerted in the vertical plane containing axis Y, and will measure the pivoting of the electrode holder body on axis y by measuring the pivoting of axis X in relation to the vertical, by means of an accelerometer subjected to forces exerted in the vertical plane containing axis X. In addition, a third accelerometer of the inclinometer could supply a signal representing the pivoting of axis Z of the electrode holder body in relation to the vertical V, should it be necessary to distinguish between two symmetrical pivoting movements around the axes X and y.

Figure 4:
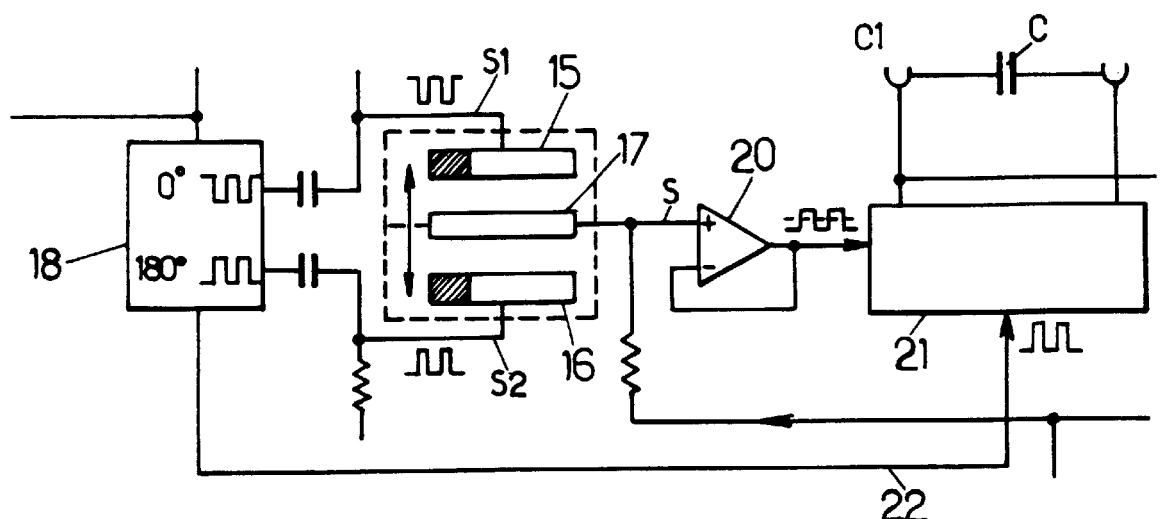
FIG. 4 shows a circuit which can be used to measure variation of the capacitance of the accelerometer.

As indicated above, the accelerometers will preferably be of the capacitance type. Since the acceleration exerted on the sensors is translated by the displacement of a mass subjected to the opposing action of a spring, the variation in the capacitance of the sensor is proportional to this displacement when the displacement is relatively small, so that measurement of the variation allows this displacement to be known, and therefore the acceleration exerted on the sensor, and therefore its angle of pivot in relation to the vertical V. An integrated circuit for measuring such a variation in capacitance, with sensors supplying phase-modulated pulse signals, is shown in FIG. 4.

The sensor includes several unitary cells and a common feeder in the form of a comb. The capacitance variation detector is formed of fixed independent teeth 15, 16 and moving central teeth 17 integral with the feeder, which move as a function of the acceleration applied, that is, as a function of the inclination of the sensor concerned of the inclinometer unit fixed to the electrode holder body, in relation to the vertical reference axis. The two capacitances thus formed between the central teeth 17 and the moving teeth, firstly 15 and secondly 16, are connected in series to form a capacitance divider with the moving central armature carrying teeth 17. The fixed armatures carrying teeth 15, 16 are monitored differentially by a signal of 1 MHz frequency, for example, supplied by an oscillator 18 in the form of two signals s1 and s2 of the same amplitude but dephased by 180°. At rest, the values of the two capacitances 15–17 and 16–17 are equal, and the potential difference of the central armature is zero. When an acceleration is applied to the sensor, the moving armatures of the central feeder move towards one of the two series of fixed armatures 15 or 16, creating an imbalance between the two capacitances and, on the central armature, a signal s the amplitude of which varies proportionally to the acceleration applied. The potential difference is "buffered" in 20 and applied to a synchronous demodulator 21, the clock of which is phase-monitored (connection 22) by the oscillator 18. The output c1 of the demodulator is positive if the potential difference is synchronous and in phase with the clock, and negative if the signals are dephased by 180°, all other signals being filtered out. The external capacitance C fixes the passband of the demodulator 21.

In this way, by means of the corresponding accelerometers, one obtains conveniently and with sufficient precision, signals representing the inclination of axes X, Y and, if applicable, Z of the electrode holder body 1 in relation to the vertical reference direction V, and therefore representing the orientation of this body, so that the automatic triggering of the appropriate welding sequence corresponding to the location thus registered can be activated. The operator no longer has the possibility of influencing this choice, since the inclinometer unit does not include any interface to this effect. However, an indicator, for example of the type with seven segments per digit, can show him the number of the program on the inclinometer unit.

Figure 5:
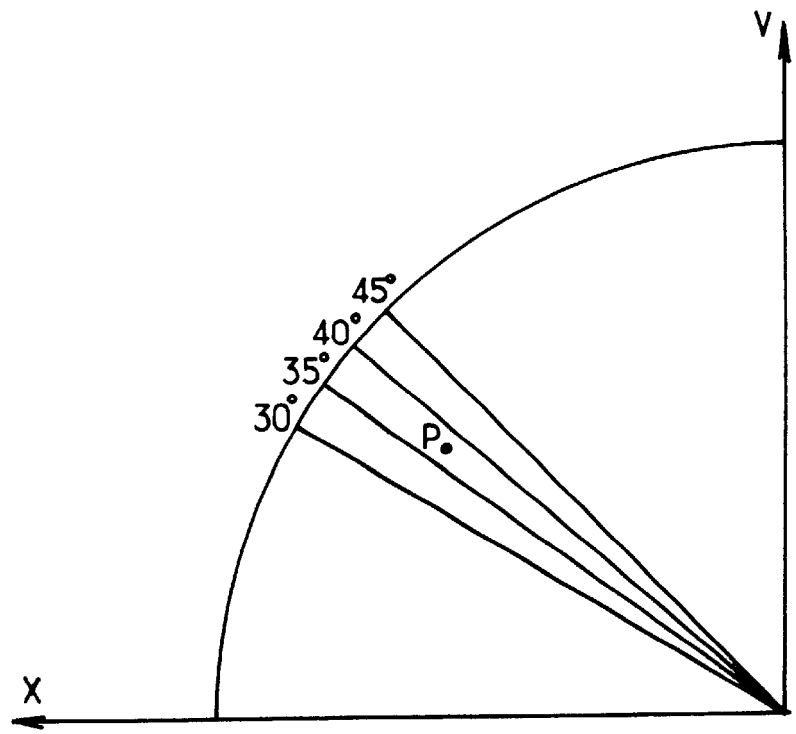
FIG. 5 shows schematically the division of space between one axis of the electrode holder body and the vertical reference direction, to be used, for example, for programming welding points and the welding zones acceptable for this point.

For the programming of the welding points by means of an appropriate interface on the programming cabinet, the space can be divided into 5° zones for each of the three axes. This is illustrated in FIG. 5, for example for the space between the longitudinal axis X of the electrode holder body 1 and the vertical reference direction V. At the time of programming the welding points the zone of this axis X (or Y) to which the defined point P belongs will be determined. The welding zone will then be the one to which point P belongs, plus the adjoining zone on each side. The tolerance in this case will be more or less 10° in relation to the positions programmed, with regard to each axis; any other method of dividing the space is, of course, also possible.

What is claimed is:

1. Method for automatically selecting a welding sequence for a manual electrode holder, concerning a manual electric resistance spot welding electrode holder for assembling sheet metal, comprising an electrode holder body (1) connected by a flexible cable (4) to an electric current supply and, if appropriate, carrying a step-down transformer to supply the welding electrode holder with high-intensity current, said electrode holder body being suspended by means of an articulated link (9, 13, 14) from a sling (6) extending while at rest along a vertical axis and preferably provided with a balancing reel (7), which articulated link comprises firstly a circular pivot collar (13) inside which said electrode holder body (1) can rotate around a principal longitudinal, swiveling axis (X), and secondly a pivot (14) mounted on said circular collar (13) and by means of which said collar, and therefore the electrode holder body (1), can pivot on the lower end of said sling (6) around a horizontal, lateral axis (y) perpendicular to said longitudinal axis (X), the electrode holder also including at least one handle (10, 11) by means of which an operator can suitably manipulate the electrode holder in relation to the sheet metal to be welded, following which he can initiate said welding sequence by actuating a control (12) on the electrode holder, wherein said electrode holder body (1) is integral with an inclinometer unit which is able to supply at least two sets of information in the form of signals:

a) information representing the value and direction of the angle of pivot of said electrode holder body (1) around said principal longitudinal axis (X) in relation to a reference axis (V); and b) information representing the value and direction of the angle of pivot of said electrode holder body (1) around said lateral axis (y) in relation to said reference axis (V), following which this information is used to identify the welding location and to automatically select the appropriate welding sequence corresponding to this location, the welding sequence identified being so coded as to be able to be transferred to and then executed by a welding control cabinet.

2. Method according to claim 1, providing a prior stage of programming or reprogramming the different welding points in a "learning" mode, carried out by means of an interface separate from said electrode holder, provided on a mobile autonomous unit and able to be connected to said control cabinet during this programming or reprogramming, said stage consisting, for each welding point, in positioning the electrode holder in the desired position at the welding point concerned and recording in a memory the characteristic angles of pivot of the electrode holder body (1) around said longitudinal (X) and lateral (y) axes as well as the acceptable tolerances for these angles, in identifying the number in the welding sequence desired at the point concerned, a reprogramming being preceded by an operation to erase the parameters previously recorded from said memory.

3. Method according to claim 1, wherein a determinate order of welding sequences is programmed into a welding sequencer, and its agreement with the sequence detected is verified by means of said inclinometer unit.

4. Method according to claim 1, providing the implementation of an operation for verifying the position of the electrodes in relation to the sheet metal to be welded, at the welding location, in order to check that the operator is positioning the electrode holder appropriately at this location.

5. Method according to claim 1, wherein said inclinometer unit includes at least two accelerometers able to measure angular displacements of said longitudinal (X) and lateral (y) axes of the electrode holder body in relation to a vertical reference axis (V).

6. Method according to claim 5, wherein said inclinometer unit includes a third accelerometer able to measure angular displacements in relation to said vertical reference axis (V) of a third axis (Z) of the electrode holder body (1) perpendicular to said lateral and longitudinal (X) axes.

7. Method according to claim 5, wherein each of the vertical planes containing the longitudinal (X) and lateral (y) axes of the electrode holder body is divided on either side of the horizontal plane into a certain number of identifiable sectors, the orientation of the electrode holder being registered by identifying the two sectors in which the axes of the two corresponding accelerometers are located respectively.

8. Method according to claims 5, wherein said electrode holder body (1) additionally carries a detector of rotation around said vertical reference axis (V).

9. Manual electric spot welding electrode holder for implementing a method according to any one of the preceding claims, comprising an electrode holder body (1) connected by a flexible cable (4) to an electric current supply and, if appropriate, carrying a step-down transformer able to supply the welding electrode holder with high-intensity current, said electrode holder body (1) being suspended by means of an articulated link (9, 13, 14) from a sling (6) extending while at rest along a vertical axis and preferably provided with a balancing reel (7), which articulated link comprises firstly a circular pivot collar (13) inside which said electrode holder body (1) can rotate around a principal longitudinal, swiveling axis (X), and secondly a pivot (14) mounted on said circular collar (13) and by means of which said collar, and therefore the electrode holder body (1), can pivot on the lower end of said sling (6) around a horizontal, lateral axis (y) perpendicular to said longitudinal axis (X), the electrode holder also including at least one handle (10, 11) by means of which an operator can suitably manipulate the electrode holder in relation to the sheet metal to be welded, following which he can initiate said welding sequence by actuating a control by a trigger or similar device (12) on the electrode holder, wherein said electrode holder body (1) carries an inclinometer unit which is able to supply at least two sets of information in the form of signals:

a) information representing the value and direction of the angle of pivot of said electrode holder body (1) around said principal longitudinal axis (X) in relation to a reference axis (V); and b) information representing the value and direction of the angle of pivot of said electrode holder body (1) around said lateral axis (y) in relation to said reference axis (V), following which this information is used to identify the welding location and to automatically select the appropriate welding sequence corresponding to this location, the welding sequence identified being so coded as to be able to be transferred to and then executed by a welding control cabinet.

10. Electrode holder according to claim 9, wherein said inclinometer unit includes at least two accelerometers able to measure angular displacements of said longitudinal (X) and lateral (y) axes of the electrode holder body in relation to a vertical reference axis (V).

11. Electrode holder according to claim 9, wherein said inclinometer unit includes a third accelerometer able to measure angular displacements in relation to said vertical reference axis (V) of a third axis (Z) of the electrode holder body (1) perpendicular to said lateral (y) and longitudinal (X) axes.

12. Electrode holder according to claim 9, wherein said electrode holder body (1) additionally carries a detector of rotation around said vertical reference axis (V).

13. Electrode holder according to claim 10, wherein said accelerometers include a capacitance sensor which supplies a width modulated pulse signal.

* * * * *